ic OmCe 3,663,450
Patented May 16, 1972

3,663,450
ALPHA OLEFIN AND DIENE POLYMERIZATION CATALYST
Charles Cozewith, Westfield, and Erik G .M. Tornqvist, Roselle, N.J., assignors to Esso Research and Engineering Company
No Drawing. Continuation-in-part of application Ser. No. 694,051, Dec. 28, 1967. This application Dec. 23, 1969, Ser. No. 887,781
Int. Cl. C08d 1/14
U.S. Cl. 252—429 B
5 Claims

ABSTRACT OF THE DISCLOSURE

A Ziegler-type catalyst system for polymerizing alpha olefins and conjugated dienes comprising (a) a hydrocarbon soluble adduct of a titanium subhalide and a Lewis base, such as the methyl- and dimethyl-derivatives of tetrahydrofuran and tetrahydrothiophene and (b) an organo aluminum compound, such as diethylaluminum chloride.

---

This is a continuation-in-part of Ser. No. 694,051 filed Dec. 28, 1967, now abandoned.

BACKGROUND OF THE INVENTION

This invention relates to a catalyst useful for the homopolymerization and copolymerization of various olefins and dienes. More specifically, the catalyst comprising an organometallic compound such as an alkyl or aryl aluminum halide and a hydrocarbon soluble complex of a titanium halide and a Lewis base is useful for the homo- and copolymerization of alpha olefins such as ethylene and propylene, or conjugated dienes such as isoprene, butadiene and piperylene.

Ziegler-type multi-component catalysts such as transition metal halides combined with organometallic compounds have been well known for over a decade. The use of these catalysts for the polymerization of various alpha olefins and conjugated dienes has also been well known. Additionally, it has been established that catalysts made from a partially reduced transition metal halide, e.g. $TiCl_3$, often exhibit more attractive properties than catalysts made from transition metal compounds in which the metal is in its maximum valence state, e.g. $TiCl_4$. The insolubility, however, of such partially reduced transition metal compounds in hydrocarbon polymerizing media often presents a problem, particularly with respect to catalyst activity in polymerizations where the use of a soluble or extremely finely divided catalyst would be desirable.

It is an object of this invention to provide a novel catalyst system useful in polymerization reactions. Other objects will be apparent to those skilled in the art.

SUMMARY OF THE INVENTION

In accordance with certain of its aspects, this invention includes a novel product complex $TiY_a \cdot n$(Lewis base) wherein Y is halide, $a$ is less than the maximum valence of titanium, $n$ is 2–3. In accordance with certain of its other aspects, this invention includes a novel catalyst system comprising $TiY_a \cdot n$(Lewis base) complex and $R_pAlX_q$ wherein R is a hydrocarbon radical, X is an electronegative radical, $p$ is at least 1, and $p+q$ equals 3.

A further aspect of this invention is directed to the polymerization of alpha-olefins or dienes using these compositions as catalysts.

The novel compositions of this invention include complexes $TiY_a \cdot n$(Lewis base). In this formula, Ti represents titanium in a valence state $a$ which is at least 1 unit less than the maximum possible valence of 4. This compound may be referred to as a partially reduced compound, particularly so when it is prepared by the reduction of titanium tetrachloride. Commonly, $a$ may be 2–3 and the compounds may be e.g. $TiY_2 \cdot n$(Lewis base) and $TiY_3 \cdot n$(Lewis base). In the formula, Y may be halide, preferably chloride or bromide. The compound $TiY_a$ may thus be a titanium subhalide, typically titanium trichloride $TiCl_3$, titanium dichloride $TiCl_2$, titanium tribromide $TiBr_3$, titanium dibromide $TiBr_2$, etc. The compound may be a mixture of titanium subhalides, e.g. an equimolar mixture of titanium dichloride and titanium dibromide corresponding to the formula TiClBr; or it may be an equimolar mixture or solid solution of titanium trichloride and titanium dichloride corresponding to the formula $TiCl_{2.5}$. In a preferred embodiment, the compound may be cocrystallized titanium trichloride and aluminum trichloride $TiCl_3 \cdot AlCl_3$ prepared by cocrystallization of $TiCl_3$ and $AlCl_3$ or by the reaction of aluminum metal with titanium tetrachloride.

The Lewis bases of the complex $TiY_a \cdot n$(Lewis base) may include organic compounds containing a heteroatom (N, O, P, S, As) and at least five carbon atoms. Typical bases include octylamine, decylamine, 4-ethyl hexylamine, 5-phenyl pentylamine, 2,5-dimethyl tetrahydrofuran, 3-phenyl tetrahydrofuran, 3-ethyl-4-propyl tetrahydrofuran, 2,5-dimethyl-3-chloro tetrahydrofuran, 2,5-dimethyltetrahydrothiophene, 3 - phenyl tetrahydrothiophene, 3-ethyl-4-propyl tetrahydrothiophene and 2,5-dimethyl - 3 - chloro tetrahydrothiophene. Particularly preferred among these compounds are the methyl and dimethyl substituted tetrahydrofurans and tetrahydrothiophenes, typically 2-methyl tetrahydrofuran, also designated as tetrahydro (2-methyl) furan.

The complexes of this invention may be prepared by reacting the compound $TiY_a$ with the Lewis base. This may be effected, for example, by refluxing one mole of the compound $TiY_a$ with at least $n$ ($n$ may be preferably 2 or 3) moles of base for about 1 to 24 hours at which point the complexing reaction may be essentially completed and the product found to comprise solid product complex typically represented by the formulae $TiY_a \cdot 2$ (Lewis base) or $TiY_a \cdot 3$(Lewis base).

Preferably, this reaction is carried out in the presence of an excess of the Lewis base and the product may be obtained in the form of a solution of $TiY_a \cdot n$(Lewis base) in an excess of Lewis base. Typically, 0.1 to 1.0 molar solution of the complex may thus be formed.

The reaction to form $TiY_a \cdot n$(Lewis base) may be carried out by placing the $TiY_a$, typically partially reduced titanium halide such as $TiCl_3$, in the thimble of a Soxhlet or Kumagawa type extractor, and passing a stream of Lewis base, e.g. 2-methyl tetrahydrofuran, through the bed of $TiCl_3$.

Recovery of the solid complex $TiY_a \cdot n$(Lewis base), if desired, may be effected by removal of excess base as by (a) distillation until the excess base is removed; (b) cooling the solution to precipitate the solid complex which may be recovered by filtration; (c) addition of precipitating agents such as anti-solvents, followed by filtration, etc. Preparation and recovery of the product are preferably carried out in the absence of oxygen, moisture, or other agents which may interfere with the reaction.

These solid complexes may typically be recovered in the form of fine crystals, usually strongly colored, and characterized by hydrocarbon solubility.

Typical illustrative complexes $TiY_a \cdot n$(Lewis base) included within the scope of this invention may be represented as follows:

TABLE I $TiCl_3 \cdot 2MTHF$
$TiCl_2 \cdot 3MTHF$
$TiBr_3 \cdot 2MTHF$
$TiBr_2 \cdot 2MTHF$
$TiCl_3 \cdot 2DMTHF$
$TiCl_3 \cdot AlCl_3 \cdot 3MTHF$ THF = tetrahydrofuran
MTHF = 2-methyl tetrahydrofuran
DMTHF = 2,5-dimethyl tetrahydrofuran The preferred complex may be $TiCl_3 \cdot 2MTHF$; and this may be found to have the following properties:

(1) Strongly red colored crystals
(2) High solubility in aromatic hydrocarbons such as benzene
(3) High solubility in e.g. methyl tetrahydrofurans
(4) Stable at room temperature for extended periods It is a particularly unexpected and important feature of the solid adduct complex of this invention that it may be found to be soluble in hydrocarbons; and particularly it may be highly soluble in aromatic hydrocarbons. If desired, the reaction to prepare the complex may be carried out in a hydrocarbon reaction medium, and the solution of the complex in the hydrocarbon may be recovered and used as such. Hydrocarbons particularly useful as the reaction medium for preparing the hydrocarbon-soluble complex includes aromatic hydrocarbons which are liquid at the temperature and pressure used in subsequent reactions, e.g. benzene, toluene, xylene, tetralin, isopropyl benzene, etc.

It is readily and conveniently possible to form solutions in aromatic hydrocarbon typically containing 0.0001 to 0.1, say 0.001 mole of titanium per liter of solution.

It is a particular feature of the novel complex that they may be used as hydrocarbon solutions for making Ziegler-type catalysts having highly useful and attractive properties. Such a solution, typically containing 0.33 part of the hydrocarbon-soluble complex $TiCl_3 \cdot 2MTHF$ in 1000 parts of benzene may be used (when subsequently combined with a suitable organometallic compound), for example, in the polymerization or copolymerization of alpha olefins (such as ethylene, propylene, etc.) or conjugated dienes (such as butadiene, isoprene, piperylene, etc.).

Polymerization reactions with such catalysts are commonly carried out in the presence of a hydrocarbon reaction medium; and the novel complexes may be conveniently prepared in or dissolved in a diluent which is compatible with (e.g. the same) the hydrocarbon diluent in which the polymerization reaction is to be carried out.

The organometallic compounds which may be used as cocatalyst include organoaluminum compounds.

Organoaluminum compounds which may be used in a typical catalysis as cocatalyst with the complex, to make a typical catalyst composition, can be represented by:

$$AlR_pX_q$$

where

R = hydrocarbon radical such as ethyl, propyl, n-butyl, iso-butyl, etc.; and

X = an electronegative atom or radical such as Cl, I, Br, OR, $NR_2$, etc.

$p + q = 3$, but $p =$ at least 1

More specifically, the organoaluminium compounds may include triethylaluminum, tripropylaluminum, triisobutylaluminum, diethylaluminum chloride, ethylaluminum dichloride, diethylaluminum iodide, dipropylaluminum chloride, tri-n-hexylaluminum, ethylaluminum sesquibromide and diisobutylaluminum hydride.

A typical composition, useful to polymerize e.g. ethylene by a Ziegler-type reaction, may include a solution containing 0.33 part by weight of complex $TiCl_3 \cdot 2MTHF$ 0.605 part of diethylaluminum chloride, and 1000 parts of benzene. A second illustrative composition useful to polymerize butadiene may include 0.354 part of complex $TiCl_3 \cdot 2DMTHF$, 2.21 parts of diethylaluminum iodide, and 100 parts of butadiene plus the amount of xylene necessary for convenient handling.

In forming a composition suitable for use in a Ziegler-type polymerization, it is found that desirable results may be achieved if the complex $TiY_a \cdot n$(Lewis base) is added to the organometal compound or the organometal compound is added to the complex. It is found, however, that a catalyst system of desired properties will not be formed if the organometallic compound is added to the solid, partially-reduced, hydrocarbon-insoluble titanium compound before the latter has been complex with the Lewis base and thus rendered hydrocarbon-soluble.

Other active compounds which may also interfere with the reaction if present during the complexing reaction between the titanium subhalide and the Lewis base may be those compounds which react with the titanium compound to prevent the formation of soluble complexes with the Lewis base. Typical compounds of this type may be the compounds normally used as cocatalysts in Ziegler-type polymerizations, e.g. organometal compounds. The complexing reaction will occur in the presence of inert compositions such as inert hydrocarbons, e.g. n-heptane.

While it is a particular feature of the novel complex of this invention, $TiY_a \cdot n$ (Lewis base), that it is prepared by the reaction of $TiY_a$ with Lewis base in the absence of other reactive components such as organometal compounds, e.g. organoaluminum compounds which may interfere with the complexing reaction, the reaction may be carried out in the presence of inert compositions, e.g. inert hydrocarbons, in which the complex (but commonly not the $TiY_a$) may be soluble. An excess of inert hydrocarbon may be used.

For example, comparative runs may be carried out as hereinafter set forth. In each run, the following amounts of materials are used:

|  | Parts |
|---|---|
| Benzene | 1000 |
| $TiCl_3$ | 15 |
| 2-methyl tetrahydrofuran | 35 |

In runs 2 and 3 there is also added 57 parts of $Et_3Al$. In each run, the components are added, in the order stated infra, to a reaction vessel at 25° C. and refluxed at atmospheric pressure for 120 minutes. The mixture is then filtered and the filtrate tested for the presence of hydrocarbon-soluble complex $TiCl_3 \cdot 2MTHF$.

(1) In this first experimental run carried out in accordance with the test procedure supra, there may be added to a reaction vessel containing an excess of benzene solvent first only $TiCl_3$, and then 2-methyl tetrahydrofuran (no $Et_3Al$ was added) to form the soluble complex which is recovered in good yield from the filtrate by evaporation of benzene as solid, hydrocarbon-soluble crystals of complex.

(2) In this control run, there may be added to a reaction vessel containing benzene solvent, first $TiCl_3$, then Et$_3$Al 2-methyl tetrahydrofuran. The TiCl$_3$ did not noticeably go into solution and no complex can be recovered.

(3) In this control run, there may be added to a reaction vessel containing benzene solvent, first 2-methyl tetrahydrofuran, then Et$_3$Al, then TiCl$_3$. The TiCl$_3$ did not noticeably go into solution and no complex can be recovered.

Comparable results may be observed if e.g. (a) TiCl$_3$ is replaced by TiCl$_2$, TiBr$_3$, etc.; (b) Et$_2$AlCl is replaced by EtAlCl$_2$, Pr$_2$AlCl, Et$_3$Al$_2$Cl$_3$, etc.; and (c) 2-methyl tetrahydrofuran is replaced by 2,5-dimethyl tetrahydrofuran, etc.

From these illustrative runs, it will be apparent that the novel hydrocarbon-soluble complex is obtained only when the titanium subhalide, e.g. TiCl$_3$, and the Lewis base, e.g. 2-methyl tetrahydrofuran, are permitted to react, optionally in the presence of inert hydrocarbon solvent, e.g. benzene, in the absence of other active components such as organoaluminum compounds, e.g. triethylaluminum chloride and diethylaluminum chloride.

Specifically, by way of example, it may be observed that hydrocarbon-soluble products may be obtained when TiCl$_3$ and MTHF are reacted in the absence of other components (Run 1).

Surprisingly, it may be observed that hydrocarbon-soluble complexes may not be obtained (Runs 2 and 3) when the Et$_3$Al is added as the second ingredient, regardless of whether the TiCl$_3$ is added first and the MTHF third (Run 2) or the MTHF first and the TiCl$_3$ third (Run 3).

A particular feature of the novel complexes of this invention when the Lewis base is selected from the group consisting of methyl substituted tetrahydrofurans, dimethyl substituted tetrahydrofurans, methyl substituted tetrahydrothiophenes, and dimethyl substituted tetrahydrothiophenes, is that the product complex is characterized by certain unexpected features:

(a) Complete hydrocarbon-solubility may be achieved when the complex contains only 2-3 moles of Lewis base per mole of titanium subhalide. Thus, if desired, the complex may be prepared and e.g. used in hydrocarbon solvent, containing only this limited amount of Lewis base—and the e.g. organoaluminum composition may be directly added thereto to form a homogeneous solution without further addition of Lewis base during the polymerization of e.g. butadiene.

(b) The complex may contain, or be dissolved in, additional quantities of Lewis base with no decrease in activity of the catalyst. Thus, it may be possible to readily vary the amount of Lewis base in accordance with external requirements, without any significant detrimental effect on the catalyst activity.

Polymerization may be effected in appropriate reaction vessels.

The total amount of catalyst employed in the polymerization reaction may vary within rather wide limits depending upon the particular conditions of the polymerization, but is generally in the range of from about 0.001 to about 0.3 wt. percent, preferably 0.005 to 0.1 wt. percent, based upon the total reaction mixture comprising the monomers to be polymerized and the reaction diluent.

The molar ratio of organometallic compound to titanium compound in the total catalyst may also vary widely; however, this ratio is generally between 2:1 and 200:1, preferably between 3:1 and 20:1 and most preferably between 3:1 and 10:1. The molar ratio between the Lewis base and the titanium compound usually ranges from 2:1 to 3:1.

The conditions at which the polymerization reaction is conducted can also vary over a wide range. Generally, temperatures ranging from less than 0° C. to about 100° C. can be used; however, temperatures ranging from about 15° to 70° C. are preferred. Pressures ranging from sub-atmospheric to about 10 atmospheres, depending upon the vapor pressures of the olefins, can be employed in the polymerization reaction. The reaction times used in the formation of the preferred polymers depend in general upon the temperatures and catalyst concentrations used. Reaction times ranging from 5 minutes to 200 hours can be employed; however, it is more usual to use reaction times ranging from about 0.25 to 25 hours.

The reaction vessel used for the polymerization can be constructed of any material that is inert to the reactants and is capable of withstanding the operating pressures. Reactors made of glass, stainless steel and glass-lined steel may thus be used.

Upon completion of the polymerization reaction, the polymerization catalyst may be deactivated by the addition of a small quantity of a suitable deactivating agent, such as a lower alkanol. When the polymer formed is insoluble in the polymerization diluent, it may be recovered directly from the polymerization mixture by filtration or centrifugation. When the polymer product is soluble, it may be recovered from the reaction mixture by precipitation with an antisolvent such as a lower alkanol followed by filtration, or centrifugation, or by solvent evaporation.

The molecular weights of the polymers of the present invention may range from 10,000 to 3,000,000 and are usually in excess of 200,000. The diene polymers of this invention contain reactive unsaturation and may be cured to form highly useful vulcanized materials of varying properties. Any one of a wide variety of curing procedures may be employed, such as sulfur curing or free radical curing.

The polymers of this invention have many varied uses. They may be employed in the preparation of tires, inner tubes, hose and tubing, wire and cable coatings, as well as for a wide variety of coated or molded articles.

DESCRIPTION OF THE PREFERRED

The invention and its advantages will be better understood by reefernce to the follownig examples:

Example 1

A complex of TiCl$_3$ and tetrahydro-(2-methyl)-furan (MTHF) was prepared in a Kumagawa extractor. TiCl$_3$ was charged to the extractor thimble and MTHF was passed through the thimble at reflux temperature until complete solubilization of the TiCl$_3$ had occurred. The excess MTHF was then distilled off from the solution and a solid benzene soluble adduct of TiCl$_3$ and MTHF was obtained having the formula TiCl$_3$·3MTHF.

A dried 8 oz. bottle was charged in the absence of air and water with 134 cc. of dry benzene, 9.8 g. butadiene, 0.0206 g. TiCl$_3$—MTHF complex and 0.0318 g. AlEt$_2$I. The bottle was then capped and the polymerization was allowed to proceed at room temperature. The monomer conversion was 74% and the resulting polymer contained 94% cis-1,4 units, 2% trans-1,4 units and 3.8% 1,2-addition units. The inherent viscosity value in toluene at 25° C. was 5.25.

Example 2

The catalyst preparation process of Example 1 was repeated. 13.6 grams of isoprene was added to the reaction vessel followed by 0.041 gram of TiCl$_3$—MTHF complex and 0.85 gram of AlEt$_2$I. In this case, the conversion of the monomer was 85% and the resulting polymer structure was made up of 64% cis-1,4, 16% trans-1,4, 1% 1,2- and 20% 3,4-units. The polyisoprene produced was tacky rather than elastomeric in nature.

Example 3

The catalyst preparation process of Example 1 was repeated. Piperylene was polymerized to a rubbery polymer by means of the catalyst system and the procedure described in Example 1. There was employed 17.6 grams of piperylene, 0.041 gram of TiCl$_3$—MTHF complex and 0.085 of AlEt$_2$I. The monomer conversion was 70% and the resulting polymer structure was made up of 23% cis-1,4, 43% trans-1,4, and 34% 3,4-addition units. The inherent viscosity in toluene at 25° C. was 1.35.

Example 4

A catalyst was produced in a manner similar to that described in Example 1, but this time employed for the copolymerization of 15.1 grams of butadiene and 10.2 grams of isoprene in the presence of 0.041 gram of the $TiCl_3$—MTHF complex combined with 0.085 gram of aluminum diethyl iodide. The conversion of the butadiene monomer was 40%, while that of the isoprene monomer was 100%. The resulting inherent viscosity of the reaction product in toluene at 25° C. was 0.70.

Example 5

A dried, nitrogen filled, 1 liter stirrer flask was charged with 500 cc. of dry benzene which was then saturated at 23° C. and 1 atm. total pressure with dry, oxygen-free ethylene. To this solution was added 0.240 g. of $AlEt_2Cl$ and 2 cc. of a benzene solution containing 0.065 g. of the $TiCl_3$—MTHF complex prepared as described in Example 1. Formation of solid polyethylene began immediately after the addition of the titanium complex. The ethylene flow to the reactor was maintained at 1 l./min. for 30 minutes and the run was then terminated by addition of isopropanol to the reactor to deactivate the catalyst. A yield of 3.05 g. of solid polyethylene was obtained by filtration of the reaction product. The inherent viscosity of the polymer (measured in decalin at 135° C.) was 7.58.

Example 6

A procedure identical to that in Example 5 was used except that 0.114 g. of $AlEt_3$ was charged instead of $AlEt_2Cl$. The yield of solid polyethylene was 3.28 g. and the inherent viscosity of the polymer (measured in decalin at 135° C.) was 12.5.

Example 7

A dried, $N_2$ filled one liter stirred flask was charged with 500 cc. of dry benzene which was then saturated at 23° C. and 1 atm. total pressure with an ethylene-propylene mixture containing 35 mol percent ethylene. When saturation was complete, 0.114 g. of $AlEt_3$ was charged to the reactor followed by 2 cc. of a benzene solution containing 0.065 g. of $TiCl_3$—MTHF complex prepared as described in Example 1. The ethylene-propylene flow to the reactor was maintained at 3.3 l./min. for 30 minutes and the run was then terminated by addition of isopropanol to the reactor to deactivate the catalyst. The copolymer formed was precipitated from solution by the addition of 1500 cc. of isopropanol to the reactor cement. A yield of 1.03 g. of a rubbery copolymer was recovered. The ethylene content of the copolymer was found to be 75 wt. percent by infrared analysis and the inherent viscosity of the copolymer (measured in decaline at 135° C.) was 3.90.

Further advantages of this invention will be apparent to those skilled in the art. Polymers of conjugated dienes that are readily sulfur curable can be conveniently and efficiently prepared with the catalyst system of the present invention. It is to be understood that this invention is not limited to specific examples set forth herein, which have been offered merely as illustration, and that modifications may be made without departure from the spirit and scope of the appended claims.

What is claimed is:

1. A method of forming a catalyst system for the polymerization of monomers selected from the group consisting of alpha olefins and conjugated dienes, which comprises:
    (a) forming a complex of a titanium subhalide and a Lewis base by mixing together, in the presence of a solvent:
        (i) said titanium subhalide having the formula $TiY_a$ wherein Y is a halide selected from the group consisting of chlorine and bromine, $a$ is a number less than the maximum valence of titanium; and
        (ii) a stoichiometrically excess amount of said Lewis base selected from the group consisting of methyl tetrahydrofuran, dimethyl tetrahydrofuran, methyl tetrahydrothiophene and dimethyl tetrahydrothiophene;
    wherein said complex has the formula $TiY_a \cdot n$ (Lewis base) and $n$ is an integer from 2 to 3; and
    (b) adding to the complex an organoaluminum compound having the formula $R_pAlX_q$ wherein R is a hydrocarbon radical, X is chlorine, iodine or bromine, $p$ is at least 1, and $p+q$ equals 3.

2. The method of claim 1 wherein said complex is formed in the presence of an inert hydrocarbon solvent.

3. The method of claim 1 wherein said titanium subhalide is $TiCl_3$.

4. The method of claim 1 wherein the complex is $TiCl \cdot n$ (methyl tetrahydrofuran).

5. The method of claim 2 wherein the organo-aluminum compound is aluminumidiethyl chloride.

References Cited

UNITED STATES PATENTS

| | | | |
|---|---|---|---|
| 3,129,209 | 4/1964 | Hague et al. | 252—429 B UX |
| 3,441,551 | 4/1969 | Jezl et al. | 252—429 B X |

FOREIGN PATENTS

| | | | |
|---|---|---|---|
| 4/329,397 | 12/1968 | Japan | 252—429 B |

PATRICK P. GARVIN, Primary Examiner

U.S. Cl. X.R.

260—82.1, 88.2, 93.7, 94.3, 94.9 C, 429.5